UNITED STATES PATENT OFFICE.

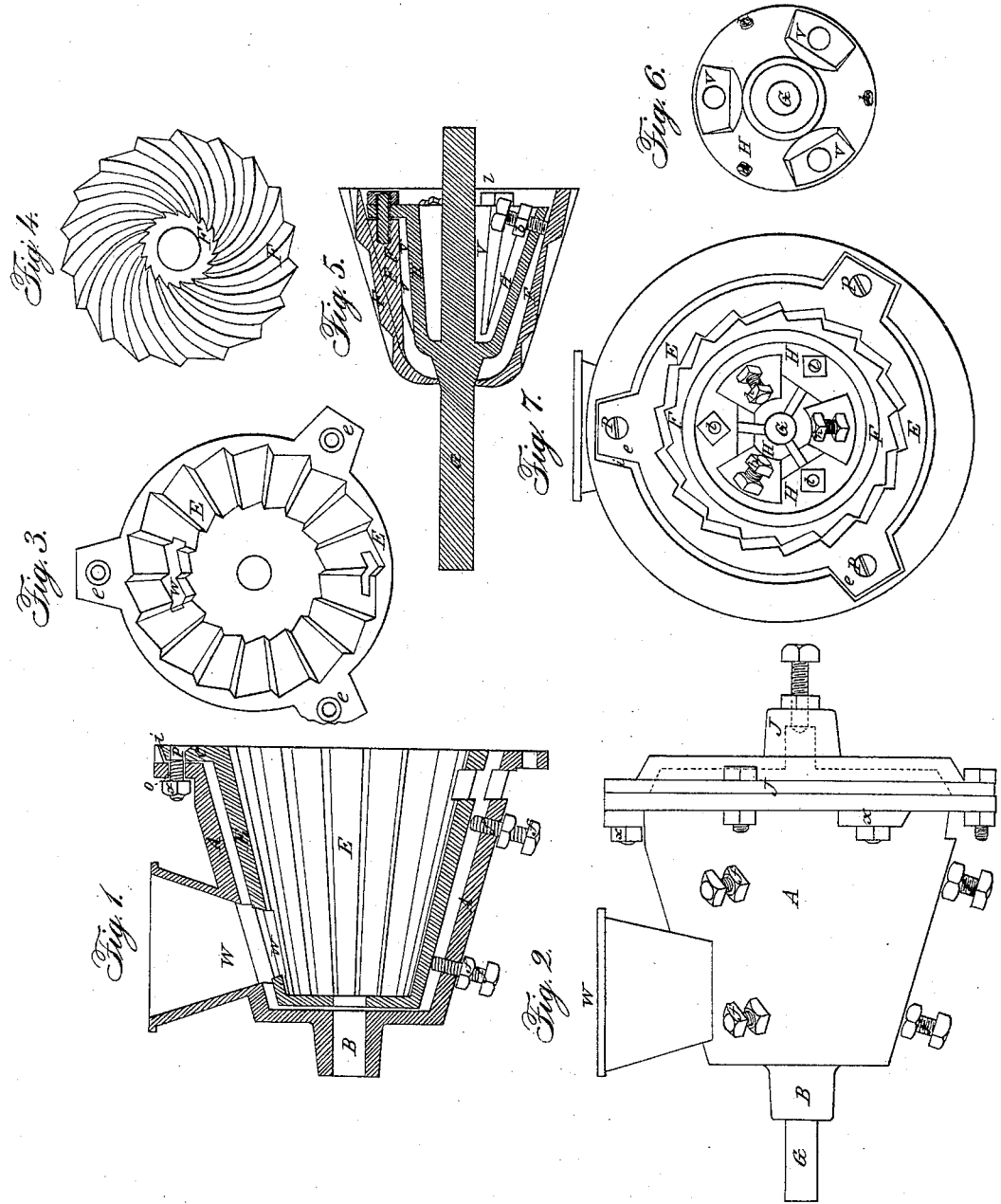

EZRA COLEMAN, OF NEW YORK, N. Y.

ATTACHING THE GRINDING-SURFACES OF QUARTZ-MILLS.

Specification of Letters Patent No. 27,695, dated April 3, 1860.

*To all whom it may concern:*

Be it known that I, EZRA COLEMAN, of New York, in the county and State of New York, have invented, made, and applied to use certain new and useful Improvements in the Mode of Attaching the Grinding-Surfaces of Mills Employed in the Grinding of Quartz, Ores, and Other Substances; and I do hereby declare the following to be a full, clear, and exact description of the same, reference being had to the accompanying drawings, making a part of this specification, and to the letters marked thereon, in which—

Figure I is a vertical cut section of a portion of the mill, showing shell, front bearing, outer grinding surface, screws for regulating the position of the same, and the means of attaching the same to the shell; Fig. II, a side view of the grinding portion of the mill. Fig. III, a view of the outer grinding surface detached; Fig. IV, a view of the inner grinding surface detached; Fig. V, a sectional view of the shaft, to which the inner grinding surface fits. In this view the cone fitted to the shaft is shown, as also the set screws for regulating the inner grinding surface; Fig. VI, a top view of the cone attached to the shaft; Fig. VII, a top view of the grinding surface attached to the shaft, with the means of regulating the position of the same; also the cone fitting onto the shaft; also the outer grinding surface attached to the shell.

In the drawings similar parts of the invention are designated by the same letters.

It is a well known fact that in mills employed for the grinding of quartz, ores, and other substances, the grinding surfaces of the same, do not last any great length of time, but are easily worn out, in which case it becomes necessary to remove the grinding surfaces so destroyed and supply their places with new ones.

The nature of my invention consists in a ready and direct attachment of these grinding surfaces, by which economy of time and expense is gained.

The nature of my invention further consists in the means employed by me for regulating the positions of the said grinding surfaces toward each other, by which means the same are trued.

To enable others skilled in the art to make and use my invention I will proceed to describe its construction and operation.

The parts employed by me comprise a conical shell (A) formed of iron and provided with an opening at its front bearing (B) through which a shaft (G) to which is attached as hereinafter described the inner grinding surface (F) passes. This conical shell (A) is provided on its inner rim or flange with recesses (*i i*). On the recesses the outer of the grinding surfaces (E) formed of chilled iron, and provided with bosses (*e, e, e*) rests. The recesses, (*i i*) are provided with openings (*o*) intended for the reception of screws (*p*) which passing through the bosses or projections (*e, e, e*) of the outer grinding surface (E), fitting into the recesses (*i i*) and through the openings (*o*) in the same and being fastened by nuts (*x*) on their under side, serve firmly to fasten longitudinally and hold in position the outer grinding surface (E) placed within the conical shell (A). The shell (A) is also provided on its outer edge with a series of screws (*f, f, f, f*) passing through the same, and bearing directly upon the outer grinding surface (E) thus introduced and attached. By means of these screws (*f, f, f, f*) the position of the outer grinding surface (E) with respect to that of the inner one (F) is regulated and the same is trued, and held in position laterally by the same. The inner grinding surface (F) which I employ is made also of chilled iron and rests upon a shaft (G) passing through it. This journal or shaft (G) is provided with a cone (H) attached to it, which fits the front end of the inner grinding surface (F); the back end of the inner grinding surface (F) being larger than the back end of the cone (H) is held in its place by set screws (*h, h, h,*) passing through the back end of the cone (H) attached to the shaft (G) and having their bearing on the inside of the inner grinding surface (F), as in the case of the outer grinding surface (E) and for the same purpose, namely, trueing and holding the same in position.

The inner grinding surface (F) is provided on its interior with projections (F F), cast directly upon the same, the cone (H) upon the shaft (G) being provided with recesses (V V), so that the projections (F, F) on the inside of the inner grinding surface (F) may fit into the same. These projections (F, F), cast on the interior of the inner grinding surface (F) are provided with screws (*l*) by which the inner grinding surface (F) is attached firmly longitudinally to the cone (H) on the shaft (G). No set screws are employed at the front end of the inner grinding surface (F) from the fact that the shaft (G) being provided with a cone (H) as described, and the inner grinding surface (F) being tightened longitudinally by the screws (*l*) is held firmly in its place, and revolves with the shaft (G). The inner grinding surface (F) thus attached to the shaft (G) is placed within the outer grinding surface (E) attached to the conical shell (A), by passing the shaft (G) through the opening at the front bearing (B) of the shell (A). The back-bearing (J) of the same, is formed by a circular plate of metal attached to the larger end of the shell (A), and being, in like manner with the front bearing (B) provided with an opening through which the shaft (G) passes. By this means it will be seen that the bearings (B and J) upon which the shaft (G) runs are attached to the conical shell (A) and are independent of the grinding surfaces (E and F) and that the grinding surfaces (E and F) may be replaced as often as desired without interfering with the general arrangement of the mill.

To admit of the introduction of the quartz, ore, or other substance to be ground I place upon the outer edge of the conical shell (A) an opening (W) through which the same may pass or be fed: the same being discharged through an opening at the large end as is usual in conical mills.

The method above described of attaching the grinding surfaces (E and F) is of the utmost importance, as, being formed of chilled iron, they cannot be filed or chipped, consequently the necessity of employing the means stated or some equivalent device as wedges or otherwise.

My improvements will be found particularly valuable to parties engaged in mining operations.

I do not desire to confine myself to any peculiar shape of shell as these improvements may be used in connection with a shell of any shape.

Having thus described the improvements as made by me, what I claim as new and desire to secure by Letters Patent is—

In combination with the hollow shell A provided at its ends with suitable shaft bearings, the shaft G, and detachable grinding surfaces E and F, I claim the longitudinally acting screws *l, l, l* and the radially acting and concentrically adjusting screws *f, f* and *h, h*, the whole arranged constructed and operated substantially as and for the purpose herein set forth.

EZRA COLEMAN.

In presence of—
 ALBERT PALMER,
 A. SIDNEY DOANE.